United States Patent [19]

McBrearty

[11] Patent Number: 5,794,013
[45] Date of Patent: Aug. 11, 1998

[54] SYSTEM AND METHOD FOR TESTING COMPUTER COMPONENTS IN DEVELOPMENT ENVIRONMENTS

[75] Inventor: Gerald Francis McBrearty, Austin, Tex.

[73] Assignee: International Business Machines Corporation, Armonk, N.Y.

[21] Appl. No.: 739,083

[22] Filed: Oct. 28, 1996

[51] Int. Cl.[6] .................................................. G06F 9/455
[52] U.S. Cl. ............... 395/500; 707/526; 395/183.09; 395/294; 395/500; 395/829; 395/701
[58] Field of Search .................... 395/500, 701, 395/829, 294, 183.09; 707/526

[56] References Cited

U.S. PATENT DOCUMENTS

| 4,775,969 | 10/1988 | Osterlund | 369/53 |
| 5,033,049 | 7/1991 | Keener et al. | 371/23 |
| 5,034,914 | 7/1991 | Osterlund | 364/900 |
| 5,121,492 | 6/1992 | Saville, III et al. | 395/500 |
| 5,175,822 | 12/1992 | Dixon et al. | 395/275 |
| 5,204,951 | 4/1993 | Keener et al. | 395/325 |
| 5,206,939 | 4/1993 | Yanai et al. | 395/400 |
| 5,325,532 | 6/1994 | Crosswy et al. | 395/700 |
| 5,418,918 | 5/1995 | Vander Kamp et al. | 395/375 |
| 5,455,926 | 10/1995 | Keele et al. | 395/404 |
| 5,471,636 | 11/1995 | Hauck | 395/800 |
| 5,495,581 | 2/1996 | Tsai | 395/154 |
| 5,499,378 | 3/1996 | McNeill, Jr. et al. | 395/500 |
| 5,581,740 | 12/1996 | Jones | 395/500 |

*Primary Examiner*—Kevin J. Teska
*Assistant Examiner*—M. Irshadullah
*Attorney, Agent, or Firm*—Robert M. Carwell

[57] ABSTRACT

A device emulator for use in testing pre-release program code emulates and replaces a first storage device such as a SCSI CD ROM drive containing the program code on CD ROM with a second storage device such as a SCSI hard drive. The emulator receives SCSI commands from an SCSI bus from a target system intended for the first drive. Through use of an emulator library, the emulator effects reads from the second device as if they were from the first device, and places the result on the SCSI bus. Testing personnel are thereby enabled to test the code on the second device which essentially behaves as the first device without the necessity of awaiting production and distribution of CD ROMs containing the test program code.

10 Claims, 2 Drawing Sheets

SYSTEM AND METHOD FOR TESTING COMPUTER COMPONENTS IN DEVELOPMENT ENVIRONMENTS

TECHNICAL FIELD

This invention relates to testing of computer systems and related prototype hardware and software programs and, more particularly, relates to technology for more efficient distribution and testing of same.

BACKGROUND OF THE INVENTION

In modern computer system development environments, there are numerous facets of such systems having related software modules, hardware components, and other information in need of rigorous tests before the systems are marketed and distributed. These tests include, to name but just a few, tests to verify compatibility, functional and engineering verification tests, human factors tests for user friendliness, etc., tests related to softcopy system documentation and the like.

Not only are such tests obviously quite numerous, but the types of program code images being tested are equally numerous and varied. These may range from tests on system boot code, directory structures of system code, installation images, and softcopy documentation to name but a few.

Throughout the history of the computing field, there have been relatively simply development environments which were quite adequate for use by relatively small development organizations, such as perhaps two to five software development/test engineers. Such small development groups have, in limited instances, been quite capable of performing all of the aforementioned conventional functions of creation, testing, and distribution of many forms of software ranging from simpler operating systems in the early days of computer to relatively simple applications.

In such circumstances, it was equally a much less complex task to handle the quick and efficient distribution of software under development internally to those limited individuals in need of accessing it for test and development. For example, it was not uncommon in the earlier days of computing for the individual who wrote and then tested the program code to be one and the same. It was also not uncommon for such small development organizations to be able to access code on the same machine or storage media or on machines in close physical proximity, or to pass around changes to such program code easily and conveniently on a relatively small number of diskettes.

However, with the growth of the computer industry, it has now been commonplace to encounter software and hardware systems development houses having large numbers of individuals involved in the development and testing of such systems, in some distances numbering in the hundreds or perhaps even thousands, each with their own compartmentalized tasks relating either to development or testing. There are many reasons for the increasing numbers of people involved in system and software development. Not the least of these is the sheer complexity of modern software which may now be executed, (arising from the increasing affordability of extremely powerful machines and networks) and the need for such systems to be rigorously tested in numerous heterogeneous environments and distributed systems, etc. Yet another important reason for involving large numbers of individuals in modern day development is simply the proliferation of such computer systems, and even more importantly the realities of the marketplace which dictate that time-to-market be of paramount importance. Whereas heretofore development cycles may have been on the order of a few years, with the advent of the explosion of the personal computer environment space, such development cycles have shortened to even as little as 3–6 months. Accordingly, there is now a strong imperative to find extremely quick and efficient mechanisms for getting software under development in the hands of these vast numbers of individuals so that they may complete their respective tasks quickly of testing boot code, installation images, making corrections to software documentation, and the like.

With the foregoing in mind, it should be readily apparent that the advent of CD ROMs as a medium of distribution of this interim development code was a boon to the development community. This afforded an extremely inexpensive way to replicate media containing development code and to effect its distribution to the development community. However, notwithstanding this significant improvement over prior art methods which included physical duplication of great numbers of diskettes, etc., nevertheless in each release cycle there was still a great deal of idle time waiting for the distribution personnel in the development organization to pull in the various images in need of replication, to build the CD ROM, and to replicate and distribute it to the appropriate individuals. Delays of a week or even so little as a few days in awaiting new code drops or fixes could cumulatively become an extremely serious problem adversely affecting the ability of a software development organization to remain competitive.

As a specific example of the needs of the development community related to the foregoing, one aspect of code which is typically developed is boot code which performs the function of bringing up machines. Once such boot code is altered or created, it is highly desirable to have it distributed quickly to the test community. Notwithstanding the aforementioned delays, this out of necessity was often done by laboriously replicating the boot code on CD ROMs and then distributing the CD ROMs to the necessary test individuals. One benefit to this form of distribution was that in actual production the boot code may very well be distributed on a CD ROM media format. Thus, the testing organizations were thereby enabled not only to test the boot code itself but to test it on the media it would ultimately be distributed on, e.g., in the CD ROM format.

However, this presented several problems. First, as previously noted the production and reproduction of CD ROMs can be quite time consuming. Next, notwithstanding that CD ROM drives have become quite cheap, it is by no means a given that all developers and testers in a development organization will have access to such drives. Moreover, even if this were the case, the various formats, form factors and physical design of drives are changing at an increasingly rapid rate. Even if the necessary personnel had access to a CD ROM, it might nevertheless be desirable to distribute the same code commercially in yet another format, e.g., a different CD format or perhaps pre-loaded for use in a tape drive, hard disk, optical disk, or the like. For the foregoing reasons, an innovation was highly sought after in the industry which would facilitate the replication and distribution of test code rapidly, inexpensively, and efficiently to a wide number of developers. A need was further felt for an ability to do so in a manner in which not only could the code per se be tested, but also in the format and on the device in which it would ultimately be installed and utilized in the commercial environment.

SUMMARY OF THE INVENTION

A device emulator replaces a fast storage device such as a CD ROM drive in a computer system, and is for use in testing pre-release program code normally stored on media such as a CD ROM read by the device. The emulator includes an emulator controller attached through an interface adapter to a bus employing a conventional bus protocol, such as PCI, IDE, MCA, SCSI or the like, utilized by the storage device. Also interconnected to the bus is a target CPU/OS to which the storage device is normally interconnected. The emulator also includes memory for storing emulation code and storage in a second storage device employing a different protocol from that of the first storage device.

In operation, assuming a SCSI bus for example, the emulator receives through the interface a SCSI command to read or write from/to the first storage device. The controller intercepts and interprets the command for the target SCSI address, and utilizing the emulation code and an emulation library, builds a command to access or write the desired information to the second storage device in the different protocol. The controller further builds and returns a SCSI response to the SCSI interface which, in turn, transmits the response from the controller to the target system. The emulation library contains emulation programs for a plurality of differing storage devices. Such emulation code, for example for a CD ROM drive first storage device, would understand the SCSI commands utilized by the first storage device and generate the necessary commands for their equivalence to be understood by the second storage device which may differ from the CD ROM in being CDR, tape, disk, diskette, or the like. A terminal interconnected to the controller permits setting of operating characteristics for each protocol's address via the terminal after the corresponding emulation module is loaded.

DETAILED DESCRIPTION OF THE PREFERRED EMBODIMENT

Figure 1:
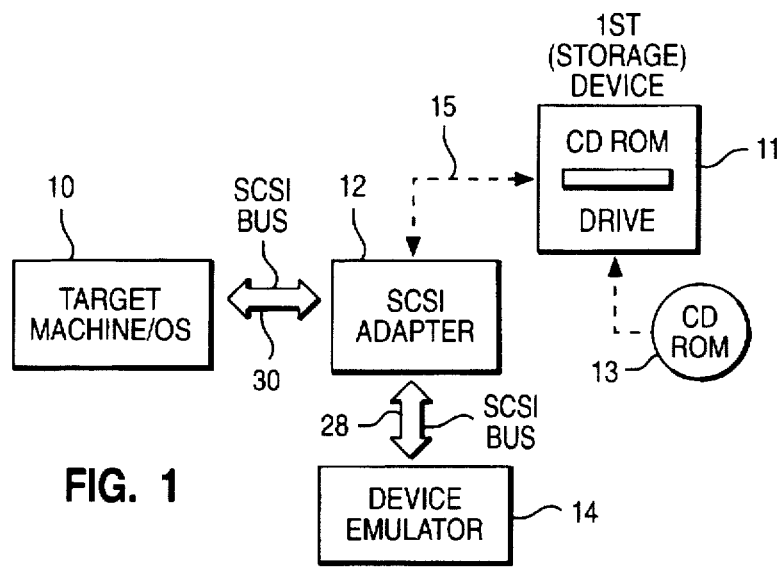
FIG. 1 is a functional block diagram illustrating the device emulator of the invention and the environment in which it is advantageously employed.

Referring to FIG. 1, it will first be noted that the embodiment described herein is with reference to devices such as SCSI CD ROM drives interconnected on a form of bus having a familiar bus protocol such as the small computer signal interface protocol (SCSI). While this convention has been utilized to depict a very practical and commonplace implementation of the invention, the invention is not intended to limited to any environment applying only this bus protocol, but rather admits to application with numerous different other protocols (such as PCI, IDE, MCA, etc.) and devices (such as tape drive, hard disk drive, diskette drive, etc.).

With respect to the implementation under consideration, however, it will generally be understood that the system depicted in FIG. 1 prior to the invention included a target machine 10, a bus structure 30 executing the SCSI protocol, an SCSI adapter 12, and a conventional SCSI CD ROM drive 11 as a first storage device. In conventional operation, development code was stored on a CD ROM medium 13. This CD ROM 13 would be installed in the CD ROM drive 11 whereby data and executable code could be read off of the CD ROM from the drive 11 through line 15 and the adapter 12 over the bus 30 and ultimately utilized in the target machine 10 for purposes of testing the code and information prior to commercial release.

It will be recalled that one problem associated with the foregoing conventional practice was the delay associated with storing the program code desired to be tested on the CD ROM 13, and the further delay associated with replicating the CD ROM medium for distribution to a large number of developers and testers. Accordingly, a fundamental concept of the invention was to create a SCSI storage device that could emulate the first storage device such as the CD ROM drive 11. This second storage device desirably had the characteristics that it would not require commands any different from those normally communicated on the bus 30 and required by the original first storage device such as the CD ROM drive 11. However, nevertheless such a second storage device desirably had the characteristic that it was of a differing fundamental technology such that the program code resident thereon could be more readily replicated and promulgated in the development community. In the implementation under consideration and currently being described, such a second storage device which effectively emulated that of the first storage device might desirably be, for example, a device emulator such as an SCSI device having a more conventional SCSI hard drive attached thereto, on which essentially the equivalent program code to that stored on the CD ROM 13 would be stored. It should be readily apparent that the immediate benefit to such a solution is that such hard drives are much more readily available, the contents may be more easily replicated than in the case of creation of a CD ROM 13 and replication thereof.

Thus, in accordance with the invention, a device emulator 14, still referring to FIG. 1, is provided which includes a second form of storage to be hereinafter described with reference to FIG. 2. This second storage device or device emulator 14 would nevertheless interact with the same adapter 12 utilized for the first storage device 11 and over the same form of bus (in this case the SCSI bus 28 having the same bus structure as that utilized on bus 30). This second storage, as previously noted, would desirably contain all the information contained on the CD ROM 13 which heretofore, prior to the invention was generated in conventional fashion. Moreover, this device emulator 14 would effectively act like and be perceived by the target machine 10 identically as if it in fact was a first storage device such as the SCSI CD ROM drive 11.

It is contemplated that the second storage device component of the device emulator 14 would contain some non-filesystem files, as well as system files desirably to be tested. Thus the device emulator 14 will include a mechanism to be hereinafter described permitting the device emulator 14 to discriminate between commands associated with such file-system files and non-filesystem files.

Moreover, as will be hereinafter detailed, the device emulator 14 further is capable in a preferred embodiment of understanding multiple differing standards such as CD standards of the first storage device 11. In this manner multiple types of such storage devices 11 may be readily tested without having to generate multiple differing CD ROMs 13 which would otherwise be associated with each such differing multiple storage device standard.

It is important to note that a feature of the implementation of the invention in FIG. 1 is that the system will employ the native device driver of the first storage device such as a native CD ROM device driver. Accordingly, the invention is not simply providing an additional process which may mimic data retrieval times for a CD ROM when reading from a SCSI disk. Rather, in accordance with the invention, the device emulator 14 such as an SCSI device emulator accepts the same SCSI requests as the SCSI CD ROM drive 11 and acts upon them accordingly, such that the substitution of the device emulator 14 for the CD ROM drive 11 is transparent to the target machine 10.

Figure 2:
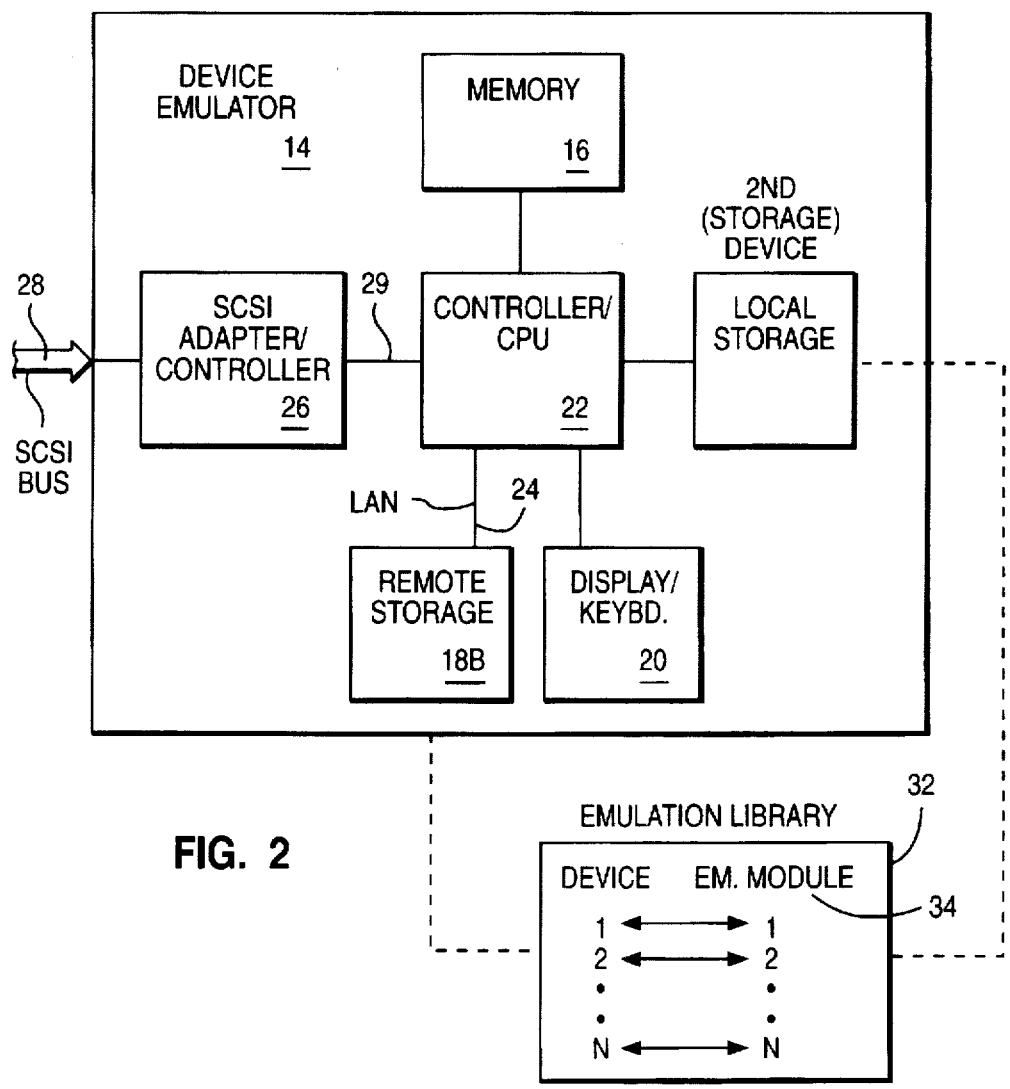
FIG. 2 is a more detailed block diagram of the device emulator of FIG. 1.

Turning now to FIG. 2, a more detailed functional block diagram of the device emulator 14 of FIG. 1 is depicted therein. The emulator 14 will include a SCSI adapter/ interface controller 26 which receives SCSI signals off the SCSI bus 28 and delivers them on line 29 to a CPU or controller 22. Conversely, signals from the CPU 22 may be sent in a manner hereinafter described on line 29 to the adapter 26 and thence on the SCSI bus 28 through the adapter 12 and ultimately to the target machine 10. A basic purpose of the controller 22 is to analyze commands received on line 29 originating from the target system 10 based upon emulator program code and corresponding emulator library routines so as to effect a read of a second storage device in a manner so as to cause the second storage device to be perceived as if it were functionally equivalent to the first storage device such as the CD ROM drive 11 and CD ROM 13. For example, if a "read" command originating from the target 10 is transmitted on the SCSI bus 28, 30, it might for purposes of illustration be a command to read 200 bytes of a tenth position on the CD ROM 13. Such a location may have a correlative location(s) on a different storage media such as the second storage device or local storage 18. Thus, a purpose of the CPU controller 22 is to decode this request for a read from a first storage device and media such that the same information may be located on the second storage device 18 and sent back on the bus structure ultimately to the target CPU 10. Essentially, then, the CPU 22 decodes the commands on line 29 into correlative commands of where the information may be retrieved from a different storage. Thus the device emulator of system 14 will include a second storage device such as the local storage 18 which may take the form of a tape drive, a hard drive, diskette drive, or the like. It may be further be desirable for the second storage device to be available remotely of the device emulator 14 and accessible through a LAN connection. This is shown by LAN connection 24 interconnected to an alternative second storage device 18. The device emulator 45 further will include memory 16 interconnected to the controller 22 which will retain emulator code utilized by the CPU 22 for proper emulation of the first storage device 11. Additionally, a conventional display 20 may be provided to facilitate and end user providing input and receiving output to set up the characteristics of the first and second storage devices 11, 18, such as the type of emulation desired. An emulation module stored in the memory 16 will be loaded and/or accessed from the CPU 22 although it may also be provided from the LAN/storage system 24, 18 or even another tape or disk drive if desired. The emulator 14 it will be appreciated will thus contain in the memory 16 and/or secondary storage for a CD ROM emulation as an example, a database of incoming CD ROM addresses of sectors, etc. which will map to corresponding blocks, etc. for other locations, depending on the medium of the second device to such locations in the second storage device.

As previously noted the first and second storage devices may take a variety of forms ranging from conventional CD ROM drives to CDR, tape or diskette or hard drives, etc. Accordingly, it is a feature of the invention to automatically accommodate these varying combinations of first and second drives. In order to do so, it will be readily appreciated that a different emulation module may be required for each such device. In the illustration under consideration, the first device was a CD ROM drive 11 and the second storage device 18 was a hard drive. Thus it is contemplated that the invention would include an emulation module 34 mapping the storage, retrieval, and other behavioral characteristics of the first storage device 11 to the second storage device 18A or 18B, such module being contained in an emulation library 32. However, in a broader and more generic sense, it will be readily appreciated that in order to accommodate the differing first and second storage devices, an emulation library 32 will include a plurality of such emulation modules 34 such as a library of characteristics of differing SCSI devices, and would include, for example, characteristics of multiple types of SCSI CD ROM drives and associated standards. In this manner, when a differing first storage device 11 is employed, for a differing second storage device 18A, 18B, essentially a lookup table will be accessible in the form of the emulation library 32 to the controller 22 so that commands associated with this new first storage device may be mapped with respect to the second storage device.

Figure 3:
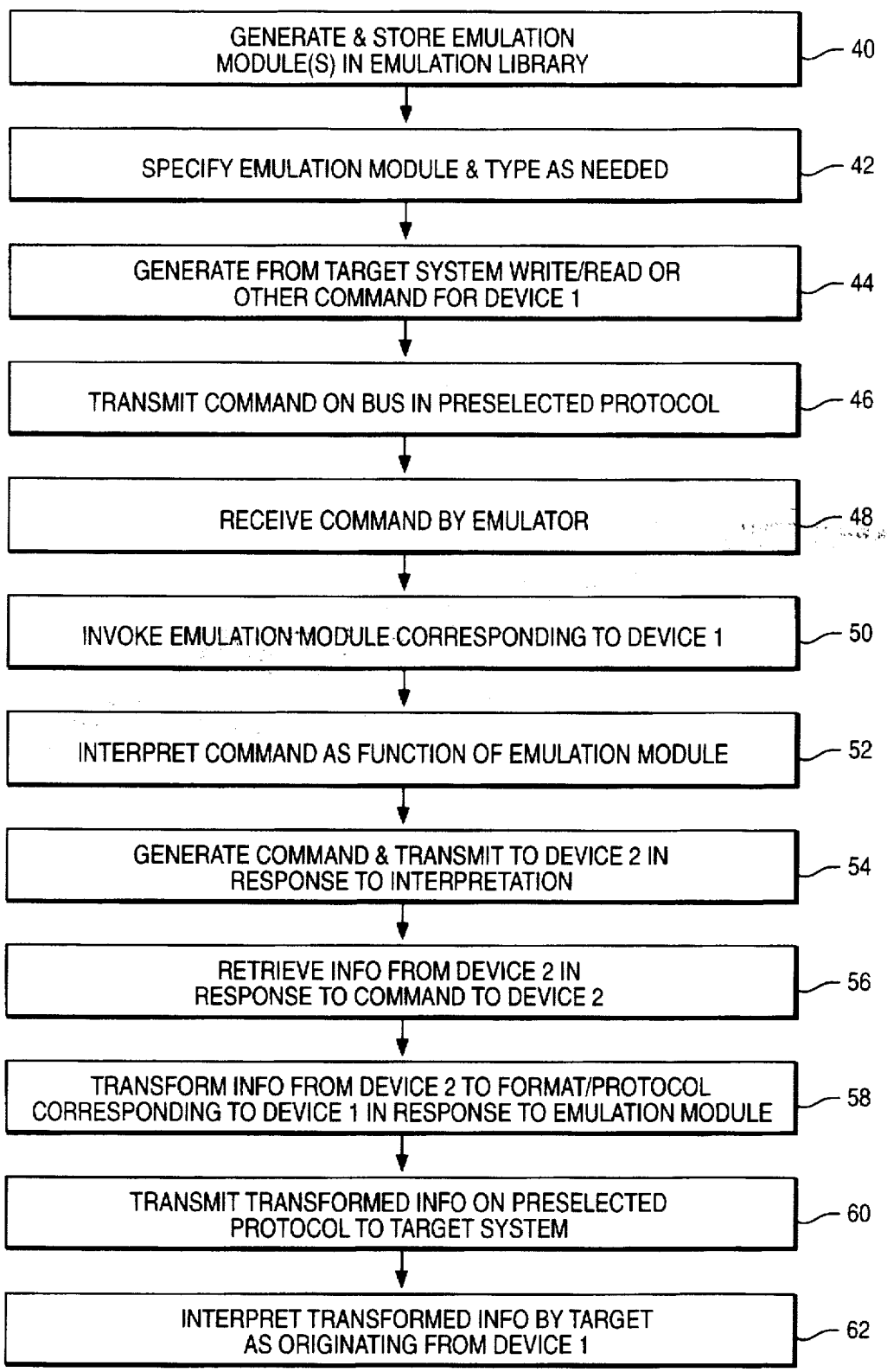
FIG. 3 is a flow diagram implementable in program code operating in conjunction with the system of FIG. 1 for effecting the steps of the invention.

Turning now to FIG. 3, illustrated therein are the steps implementable with program code executing in the system illustrated in FIG. 1 for effecting the invention. First, at least one emulation module will have been generated and stored in an appropriate emulation library 32, shown at step 40. Next, a particular emulation module is specified as well as emulation type information as needed, 42. In the case when different first and second storage devices are anticipated, actually a plurality of emulation modules will be stored in the emulation library. The particular emulation module selected at step 42 will be determined by which particular first and second storage devices are employed. Although this may be specified manually by means of a display/terminal 20, it is contemplated that based upon the character of the commands received on line 29 by the CPU 22, the character of the particular first storage device may be determined automatically by the CPU 22. In like manner, the second storage 18A or 18B may be interrogated by the CPU such that its character and identify may also be automatically determined. In this manner, the CPU 22 may automatically select the appropriate emulation module to employ from the library 32.

Continuing with FIG. 3, next a read command will be generated for the first storage device from the target system 10, step 44. It will be readily appreciated that the invention is not intended to be limited, however, only to reads from storage devices and contemplates generating any other commands associated with the particular first storage device which might, for example, include a write command. The command generated by the target system is then placed on the bus in a preselected protocol, 46. The command is then received by the emulator, 48, on the bus of the preselected protocol, whereupon the device emulator then invokes an emulation module corresponding to the first storage device, 50.

Next, still continuing with FIG. 3, the command received by the device emulator on the bus will be interpreted by the controller in the emulator as a function of the particular emulation module selected, 52. Next, the controller will generate a command transmitted to the second storage device in response to the interpretation of the command received by the controller, 54. Information will then be retrieved or written into the second storage device in response to the command transmitted to the second storage device, 56. Information received from the second storage device in response to the command thereto will then be transformed by the controller to a format and protocol corresponding to the first storage device as a function of the selected emulation module, 58. Next, this transformed information will be transmitted in the preselected bus protocol reflected in the emulation module to the target system, 60. Finally, this transformed information will be interpreted by the target system transparently as originating from the first storage device, 62.

The foregoing system generally provides the ability to distribute and test quickly and efficiently prerelease system code and, more importantly, to facilitate large numbers of individuals being able to test such code, simulating the actual hardware on which the code would be brought up in a commercial distribution. In other words, not only could testers thus test prereleased program code previously (which had to be loaded onto a manufactured CD ROM 13) by utilizing the device emulator 14, but moreover the code would be brought up as if it were running on a CD ROM 11 which ultimately would be the case in the commercial distribution.

While the invention has been shown and described with reference to particular embodiments thereof, it will be understood by those skilled in the art that the foregoing and other changes in form and detail may be made therein without departing from the spirit and scope of the invention.

I claim:

1. A method for emulating a first device with a second device for use in testing test program code in a computer system having a predetermined bus protocol carrying corresponding commands between said system and said first and second devices, said first and second devices having corresponding differing respective first and second operating characteristics, said method comprising the steps of:

storing in said second device said test program code;

placing said commands on said bus for said first device in said bus protocol;

translating said commands to adapted commands for said second device comprising
invoking an emulation module; and
translating, with said emulation module, said commands corresponding to said bus protocol and said first operating characteristic to said second operating characteristic;

transmitting said adapted commands to said second device;

actuating said second device in response to said adapted commands;

storing an emulation library containing a plurality of said emulation modules, each corresponding to a different pair of said first and second operating characteristics;

specifying one of said emulation modules from said emulation library; and detecting from said commands on said bus said first operating characteristic, wherein said specifying one of said emulation modules is in response to said detecting.

2. The method of claim 1 further including:

generating signals from said second device in response to said actuating;

translating said signals to adapted signals corresponding to said bus protocol and said first device;

transmitting said adapted signals to said system over said bus; and reading said adapted signals by said system as signals generated from said first device.

3. The method of claim 2 wherein said first and second devices are storage devices.

4. The method of claim 3 wherein said first and second devices are a CD ROM drive and hard drive, respectively.

5. The method of claim 4 wherein said CD ROM drive and said hard drive are an SCSI drive and SCSI hard drive, wherein said bus protocol is an SCSI protocol, and wherein said first and said second operating characteristics are operating characteristics of said SCSI CD ROM drive and said SCSI hard drive, respectively.

6. An apparatus for emulating a first device with a second device for use in testing program code in a computer system having a predetermined bus protocol carrying corresponding commands between said system and said first and second devices, said first and second devices having corresponding differing respective first and second operating characteristics, said apparatus comprising:

means for storing in said second device said test program code;

means for placing said commands on said bus for said first device in said bus protocol;

means for translating said commands to adapter commands for said second device comprising
means for invoking an emulation module; and
means for translating, with said emulation module, said commands corresponding to said protocol and bus said first operating characteristic to said second operating characteristic;

means for transmitting said adapted commands to said second device;

means for actuating said second device in response to said adapted commands;

means for storing an emulation library containing a plurality of said emulation modules, each corresponding to a different pair of said first and second operating characteristics;

means for specifying one of said emulation modules from said emulation library; and means for detecting from said commands on said bus said first operating characteristic wherein said specifying one of said emulation modules is in response to said detecting.

7. The apparatus of claim 6 further including:

means for generating signals from said second device in response to said actuating;

means for translating said signals to adapted signals corresponding to said bus protocol and said first device;

means for transmitting said adapted signals to said system over said bus; and means for reading said adapted signals by said system as signals generated from said first device.

8. The apparatus of claim 7 wherein said first and second devices are storage devices.

9. The apparatus of claim 8 wherein said first and second devices are a CD ROM drive and hard drive, respectively.

10. The apparatus of claim 9 wherein said CD ROM drive and said hard drive are an SCSI drive and SCSI hard drive, wherein said bus protocol is an SCSI protocol, and wherein said first and said second operating characteristics are operating characteristics of said SCSI CD ROM drive and said SCSI hard drive, respectively.

* * * * *